(12) United States Patent
Selivansky

(10) Patent No.: US 12,404,609 B2
(45) Date of Patent: Sep. 2, 2025

(54) CONCRETE CURING BLANKETS AND ANTI-BACTERIAL TEXTILE FIBERS

(71) Applicant: Dror Selivansky, Haifa (IL)

(72) Inventor: Dror Selivansky, Haifa (IL)

( * ) Notice: Subject to any disclaimer, the term of this patent is extended or adjusted under 35 U.S.C. 154(b) by 0 days.

(21) Appl. No.: 17/141,383

(22) Filed: Jan. 5, 2021

(65) Prior Publication Data

US 2021/0130985 A1 May 6, 2021

Related U.S. Application Data

(63) Continuation-in-part of application No. PCT/IB2019/059268, filed on Oct. 29, 2019.

(60) Provisional application No. 62/752,175, filed on Oct. 29, 2018.

(51) Int. Cl.
| | |
|---|---|
| *D01F 6/90* | (2006.01) |
| *B28B 11/24* | (2006.01) |
| *B32B 5/02* | (2006.01) |
| *B32B 7/02* | (2019.01) |
| *C04B 40/02* | (2006.01) |
| *D01F 1/10* | (2006.01) |

(52) U.S. Cl.
CPC ............ *D01F 6/90* (2013.01); *B28B 11/245* (2013.01); *B32B 5/022* (2013.01); *B32B 7/02* (2013.01); *C04B 40/0277* (2013.01); *D01F 1/103* (2013.01); *D10B 2331/02* (2013.01); *D10B 2401/13* (2013.01)

(58) Field of Classification Search
None
See application file for complete search history.

(56) References Cited

U.S. PATENT DOCUMENTS

| | | | |
|---|---|---|---|
| 5,843,554 A | 12/1998 | Katz | |
| 6,150,496 A * | 11/2000 | Ilg | C08G 69/48 |
| | | | 442/37 |
| 7,572,525 B2 | 8/2009 | McDonald | |
| 9,739,068 B2 | 8/2017 | Richards et al. | |
| 9,896,382 B2 | 2/2018 | Selivansky | |
| 10,052,791 B2 | 8/2018 | Richards et al. | |
| 2003/0220037 A1* | 11/2003 | Dewhurst | D06P 3/8209 |
| | | | 442/181 |
| 2004/0026818 A1* | 2/2004 | Klein | B65H 55/04 |
| | | | 264/210.8 |
| 2004/0137076 A1 | 7/2004 | Yamauchi et al. | |
| 2004/0243080 A1 | 12/2004 | Baer | |
| 2006/0229162 A1 | 10/2006 | Choy | |

(Continued)

FOREIGN PATENT DOCUMENTS

| | | |
|---|---|---|
| DE | 4413177 A1 | 10/1995 |
| JP | H02128071 A | 5/1990 |

(Continued)

OTHER PUBLICATIONS

Machine Translation of JP2003129355 (Year: 2003).*

(Continued)

*Primary Examiner* — Shawn McKinnon
(74) *Attorney, Agent, or Firm* — The Roy Gross Law Firm, LLC; Roy D. Gross

(57) ABSTRACT

Disclosed are fibers which include silver particles as incorporated into textile at low concentrations to render the textiles as bactericidal in accordance with various standards including government standards.

10 Claims, 2 Drawing Sheets

(56) References Cited

U.S. PATENT DOCUMENTS

| | | | |
|---|---|---|---|
| 2009/0169849 A1 | 7/2009 | Bliton et al. | |
| 2012/0289107 A1* | 11/2012 | Beissinger | D01F 8/04 |
| | | | 428/401 |
| 2012/0328821 A1* | 12/2012 | Selivansky | C04B 20/0048 |
| | | | 428/95 |
| 2016/0221216 A1 | 8/2016 | Richards et al. | |
| 2016/0229162 A1 | 8/2016 | Kafiah et al. | |
| 2017/0290329 A1* | 10/2017 | Ahmad | C08J 3/226 |
| 2017/0291385 A1 | 10/2017 | Carroll et al. | |

FOREIGN PATENT DOCUMENTS

| | | | |
|---|---|---|---|
| JP | H07305283 A | | 11/1995 |
| JP | H08232118 A | | 9/1996 |
| JP | 2003129355 | * | 5/2003 |
| JP | 2005232668 A | | 9/2005 |
| WO | 9528443 A1 | | 10/1995 |
| WO | WO9700341 | * | 1/1997 |
| WO | WO2015011001 | * | 1/2015 |

OTHER PUBLICATIONS

Nilit Body Fresh anti bacterial fibers; Fibers Properties, Compliance with regulations, anti bacterial performance.

ISR: Israel Patent Office; Feb. 18, 2020.

TUV Rheinland Test Report ; ALDI's Clean Grip fabrics anti bacterial test results ; Jun. 26, 2020.

Sukano Driven by Expertise—master batch description, Jun. 7, 2022.

HeiQ AGS20 Silver dosing agent; EPA Registration No. 85249-1, Mar. 7, 2016.

Nilit Body Fresh anti bacterial fibers; Fibers Properties, Compliance with regulations, anti bacterial performance, Oct. 23, 2019.

Reliable Concrete Accessories and SIKA's Concrete Curing Blankets : ReliableCure SOG , ReliableCure VAB, Sika Ultra Cure NCF, SIKA Ultra Cure Dot.

India Patent Office—Examination Report for Application No. 202117021296—Dec. 12, 2022.

PCT International Preliminary Report on Patentability for PCT/IB2019/059268—Apr. 27, 2021.

Supplementary European Search Report for EP Appn 19 878 629.5—Jun. 28, 2022.

European Examination Report—CF Form 1507 for EP Appn 19 878 629.5, Jun. 28, 2022.

Sukano PA am S652—Safety Data Sheet Issued Feb. 19, 2013 Revised Apr. 21, 2020 (1 Page).

* cited by examiner

CONCRETE CURING BLANKETS AND ANTI-BACTERIAL TEXTILE FIBERS

CROSS-REFERENCES TO RELATED APPLICATIONS

This application is a continuation-in-part patent application of commonly owned PCT Patent Application No. PCT/IB2019/059268, entitled: CONCRETE CURING BLANKETS AND ANTI-BACTERIAL TEXTILE FIBERS, filed on Oct. 29, 2019, which is related to and claims priority from commonly owned U.S. Provisional Patent Application Ser. No. 62/752,175, entitled: Textiles for Constriction and Protection and Applications, filed on Oct. 29, 2018, the disclosures of both of the aforementioned applications are each incorporated by reference in their entirety herein.

TECHNICAL FIELD

The invention relates to concrete curing blankets and antibacterial textile fibers.

BACKGROUND OF THE INVENTION

Concrete strength, durability, permeability and other characteristics are established as the cement in the concrete hydrates its calcium oxide and silicone dioxide to CSH (Calcium Silica Hydrate), which forms a solid gel that hardens the concrete. It is important to supply the required amount of water for the hydration process in order to keep the optimal water to cement ratio throughout the hardening time for the concrete. As a result, all measures are taken to prevent water depletion from the concrete through evaporation or other causes.

The most productive period for the hydration of the cement is within the 10 to 20 days after casting, as 70% of the strength of the concrete is gained after 14 days. Accordingly, the water content of the concrete needs to be maintained for at least 14 days, to make sure the concrete achieves at least 70% of its final strength. To this end, concrete is conventionally cured by curing blankets, to prevent evaporation and maintain the water level in the concrete.

These conventional concrete blankets exhibit drawbacks. First, they are unable to secure long curing times, with their maximum effective time being less than 14 days. Second, they are properly functional under limited weather conditions. Third, these blankets include perforations, for water transport, and must be rewetted through these perforations, to extend blanket functioning, under hot weather conditions, e.g., above 30 Degrees Celsius.

SUMMARY OF THE INVENTION

The present invention improves on contemporary concrete curing blankets, by using combinations of materials which provide high performance beyond 14 days, without having to rewet the blankets.

The present invention provides effective, reliable, easy to use, inexpensive and sustainable concrete blankets, which extend the scope of applications of the concrete curing blankets to innovative supply of admixture chemicals for treatment of the covered concrete surfaces.

The present invention uses Super Absorbent Polymers (SAP) with high water capacity, which provides for the controlled release of water to maintain high degrees of water saturation at the concrete surface for extended times, and to supply adequate amounts of water molecules for the hydration reaction of the cement to yield superior cured concretes.

The present invention creates blankets that maintain high water activity to dissolve chemical admixtures as Silicate salts and pozolanes within the curing blanket, which are designed to migrate into the concrete. This migration allows for the hardening, sealing, and the application of various surface treatments to the concrete.

Additionally, the SAP at the blanket surface creates interactions with the concrete capillaries. These interactions generate strong cohesion between the curing blanket and the concrete, which stabilizes the curing blanket's position on vertical and horizontal concrete elements.

The concrete blankets of the invention allow for a more effective and reliable concrete curing operation with much longer curing performance (sealed blankets), simpler to produce and handle (only three or two layers), easier to apply (lighter weight, and easy spread and faster water absorption and firmer sticking of the blanket to the concrete), less expensive and green (bio degradable SAP, all polyolefin materials that can be regenerated with no cellulose being used) products, such that the blankets of the present invention outperform the current state of the art curing blankets.

The present invention improves over conventional concrete blankets as it provides for curing times longer than 14 days, while minimizing water evaporation. As a result, there is no need for additional water at longer curing times. Additionally, the present invention is such that it works with a certain supply of water, which is required to complete the curing requirements (for specified concrete strength after cure time) with the required water content stored in the blanket of the invention. Also, the supply of the exact quantity of the required water molecules for the curing reaction is maintained at the correct W/C ratio versus over or under wetting, as is a problem in current curing practices.

The present invention provides concrete blankets made with low cost materials, including thinner fabrics, lower absorbent weights, and which are inexpensive to manufacture.

The present invention provides concrete blankets with larger widths than conventional concrete blankets, which cover larger areas, and due to their wettability, which allows the blanket of the invention to firmly adhere to the concrete. This rapid attachment of the concrete blankets of the present invention provides a firm attachment of the concrete blanket to the concrete for stabilizing the blankets under high wind conditions. The blankets of the invention are able to bond to vertically oriented concrete elements.

The present invention provides concrete blankets which when covering concrete, cause a raise in concrete temperatures for faster curing under low temperature conditions. The concrete blankets of the present invention incorporate concrete admixtures to the concrete for surface treatment, providing the cured concrete with improved concrete properties.

The present invention provides concrete blankets with easy and sustainable regeneration of the all Polypropylene components, without the complications from using cellulose, as is used in the blankets of the contemporary art.

The present invention provides concrete blankets made of biodegradable SAP, which is environmentally friendly and non-toxic, allowing for safe disposal.

Embodiments of the invention are directed to a concrete curing blanket. The blanket comprises: a contact layer including at least one nonwoven fabric, for contact with a concrete surface; a cover layer including a polymer film which functions as a water barrier; and, a storage layer including a super absorbent polymer material for storing liquid therein, the storage layer intermediate the contact layer and the cover layer.

Optionally, the blanket is such that the super absorbent polymer material coats fibers in a nonwoven fabric forming the storage layer.

Optionally, the blanket is such that the super absorbent polymer material is in a powder form dispersed within the fabric.

Optionally, the blanket is such that the contact layer, storage layer and cover layer are joined together by lamination with a heat activated bonding agent.

Optionally, the blanket is such that wherein the nonwoven fabric of the contact layer includes one or more of: polypropylene, polyethylene, polypropylene co-polyethylene, or polyacrylonitrile (PAN), Nylon, or, Polyester, fibers.

Optionally, the blanket is such that the nonwoven fabric of the storage layer includes one or more of: polypropylene, polyethylene, polypropylene co-polyethylene, or polyacrylonitrile (PAN), Nylon, Polyester fibers, Rayon, or cellulose three acetate.

Optionally, the blanket is such that the nonwoven fabrics are produced by processes including: Spun bonding, Spunbonding-Meltblowing-Spunbonding (SMS), Carding, Calender Bonding, Hydro-entanglement, Air through bonding, Chemical Bonding, Airlaid processes, Needle punching, Stitch Bonding, or, Wet laid process.

Optionally, the blanket is such that the nonwoven fabric of the storage layer is at least one of: stitch bonded or needle punched felts of weight per area units within the range of approximately 30-3,000 grams/square meter ($m^2$).

Optionally, the blanket is such that the super absorbent polymer (SAP) material is selected from the group of: Sodium Polyacrylate and Sodium Polyacrylamide.

Optionally, the blanket is such that Sodium Polyacrylate and Sodium Polyacrylamide are applied in the form of either: liquid or powder or SAP fibers incorporated into the fabric, and the Sodium Polyacrylate and Sodium Polyacrylamide are either Bio degradable or Bio non degradable.

Embodiments of the invention are directed to a concrete curing blanket comprising: a cover layer including a polymer film which functions as a water barrier; and, a storage layer including a super absorbent polymer material for storing liquid therein and overlying a concrete surface.

The invention provides anti-bacterial Nylon fibers, that advance the state of the art. The antibacterial fibers are made of Polyamides, or any other amino end group containing polymers comprising transition metals and/or cations of high antibacterial protection, efficiency, durability and fastness. The invention is based on the affinity of the electrophilic transition metal cations to the Nucleophilic Amino end groups (primary and secondary amines), and their tendency to form complex bonds (transition metal cations with amino group ligands complexes), which bond the reactive transition metal cations to the surface of the fibers, thereby stabilizing the cations on the fibers. As a result, the invention maintains high concentrations of reactive biocides on the surface of the fibers, providing highly effective antibacterial protection, that is stable for extended time periods.

The fibers of the invention are capable of protecting various textiles against bacteria when mixed with the textile fibers at low fiber content, and extremely low concentrations of transition metals and/or cations in the (protected) textiles.

A combination of the processes of solid state migration, activation and chemical coordination of the metals with the polyamides, at the surface of the fibers, turn the metals dispersed inside the fibers into highly effective biocides. These biocides have long lasting antibacterial activity. The reactive metals or cations affinity to the amino groups in the polyamide fibers preserves them in the fibers with characteristic long lasting activity and high fastness after excessive washing treatments. Using metal particles of the nano scale dimensions increases the rates of migration of metals to the surface of the fibers, that form a very high surface area of reactive metals at the surface of the fibers.

The present invention uses micro fibers of low diameters within the range of approximately 8 to 20 microns. This increases the surface area of the reactive metals that are exposed to the environment on the fibers' surfaces.

The present invention uses partially oriented yarns (POY), Nylon fibers of low degrees of crystallinity and orientation and higher water accessibility and diffusion coefficients, such that the antibacterial efficiency of the metal particles in the fibers is increased.

The invention applies Polyamide amino groups for coordination with transition metals or cations/nano-metals/POY microfibers, and their combinations, to create highly reactive fibers for protection of textiles via blending of the reactive fibers with the standard fibers of the textiles. The textiles are fully protected against bacteria at very low reactive fibers content, within the range of 1% over weight of the fabric, and with extremely low metal contents, such as silver, within the range of approximately 15 to 30 ppm (parts per million). This lasts the lifetime of the textile at high fastness (maintaining reactivity after 50 washing cycles at 60 degrees Celsius (C.)).

The invention is such that its lower costs and ease of application in basic textile operations, render it as superior over contemporary products, such as Silvadur™ from DuPont Dow, or any other contemporary antibacterial technology.

The present invention provides for an application of anti-bacterial Nylon POY (non drawn-texturized) fibers in textile fabrics. The contents of the antibacterial draw texturized Nylon fibers in the textile fabrics blends with other standard fiber, were previously greater than 10% over the total weight of the fabric.

Embodiments of the invention are directed to polyamide polymer fibers, each fiber comprising: at least 40 miliequvalents per Kg amino end groups and a transition metal and/or cation dispersed inside the polymer at weight contents within the range of approximately 0.10%-15.00%; and, the fibers are configured for blending inside a textile fabric at a weight content within the range of 0.015%-50.0% of the fibers of the textile fabric to render the textile as an anti-bacterial textile in accordance with American Association of Textile Chemists and Colorists (AATCC) 100-2012 standard.

Optionally, the fibers are such that they are entangled within the textile fabric structure.

Optionally, the fibers are such that each fiber includes a transition metal cations complex formation with primary amino groups having K complexing values greater than 2,000.

Optionally, the fibers are such that the content of the transition metal and/or cation in the textile fabric is within the range of approximately 5-100 ppm.

Optionally, the fibers are such that the antibacterial protection of the textile fabric lasts for between 3 to 12 months.

Optionally, the fibers are such that the antibacterial protection of the textile fabric lasts after 50 wash machine cycles at 60 degrees C., in accordance with the machine freshness standard of AATCC 100-2012.

Optionally, the fibers are such that the complex metals or Ions are of the Nano scale sizes that is lower than 0.5 microns median dimeter.

Optionally, the fibers are such that each fiber is of Partially Oriented Yarn (POY) type of tenacity within the range of approximately 3.0-4.5 grams per dtex and elongation within the range of approximately 60%-80%.

Optionally, the fibers are such that each fiber is made of one or more of: Nylon 6.6 polymer, Nylon 6 polymer, and copolymers comprising any combination of the monomers of: Nylon 6, Nylon 10, or Nylon 12.

Optionally, the fibers are such that each fiber of Nylon 6.6 polymer or Nylon 6 polymer includes amino content greater than 70 miliequivalents per Kg.

Optionally, the fibers are such that each fiber includes metal selected from the group consisting of: Copper, Silver, and silver cations.

Optionally, the fibers are such that each fiber is of a thickness is within the range of approximately 0.05-8.00 dtex.

Optionally, the fibers are such that each fiber is of a length within the range of approximately 0.1 to 100 mm.

Optionally, the fibers are such that each fiber is in the form of a continuous yarn.

Optionally, the fibers are such that each fiber includes secondary and tertiary amino end groups.

Embodiments of the invention are directed to an antibacterial textile. The textile comprises: polyamide polymer fibers, each fiber comprising: at least 35 miliequivalent per kilogram (Kg) amino end groups and Silver metal and/or Silver cation particles dispersed within the polymer of the fiber at a weight content within the range of approximately 10-100 parts per million (ppm); with the polyamide polymer fibers blended within a textile fabric at a weight content within the range of approximately 0.5%-40.0% of the fibers of the textile fabric, such that the content of the Silver metal and/or Silver cation in the textile fabric is within the range of approximately 0.2-45.0 ppm, whereby the textile fabric is antibacterial in accordance with the American Association of Textile Chemists and Colorists (AATCC) 100-2012 standard.

Optionally, the antibacterial textile is such that each fiber is of Partially Oriented Yarn (POY) type of tenacity within the range of approximately 3.0-4.5 grams per dtex and elongation within the range of approximately 60%-90%.

Optionally, the antibacterial textile is such that Silver metal and/or Silver cation particles are of diameters less than 0.5 microns median dimeter.

Other embodiments of the invention are directed to an antibacterial textile comprising: polyamide polymer fibers. Each fiber comprises: at least 35 miliequivalent per kilogram (Kg) amino end groups and Silver metal and/or Silver cation particles dispersed within the polymer of the fiber at a weight content within the range of approximately 10-100 parts per million (ppm); wherein each fiber is of Partially Oriented Yarn (POY) type of tenacity within the range of approximately 3.0-4.5 grams per dtex and elongation within the range of approximately 60%-90% to render the textile as an antibacterial textile in accordance with the American Association of Textile Chemists and Colorists (AATCC) 100-2012 standard; and, the fibers blended within the textile fabric at a weight content within the range 0.5%-40.0% of the fibers of the textile. The content of the Silver metal and/or cation particles in the textile fabric is within the range of approximately 0.2-45.0 ppm.

Optionally, the antibacterial textile is such that the Silver metal and/or Silver cation particles are of diameters less than 0.5 microns median dimeter.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

Appendices A (7 Pages), B (2 Pages), C (3 Pages), D (3 Pages), E1 (7 Pages), E2 (3 Pages), E3 (1 Page) and E4 (5 Pages), are attached to this document.

DETAILED DESCRIPTION OF THE INVENTION

I. Concrete Curing Blankets

Figure 1:
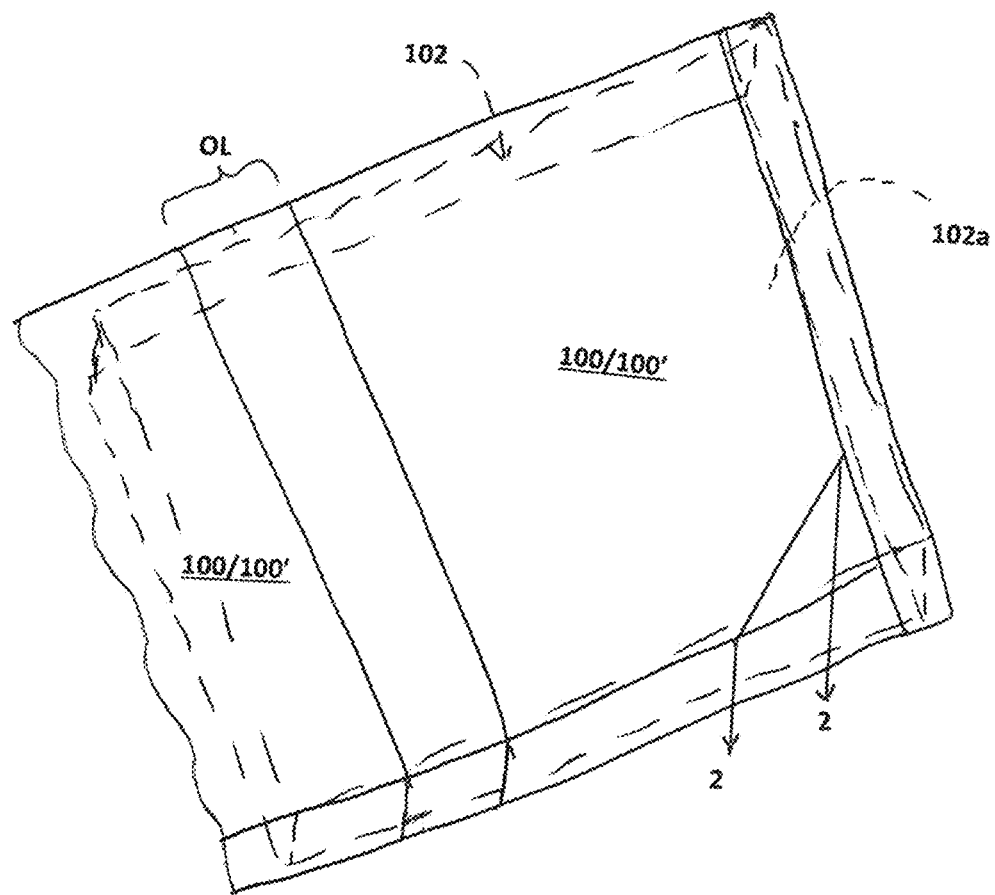
FIG. 1 is perspective view of a concrete curing blanket in accordance with the present invention.
Figure 2A:
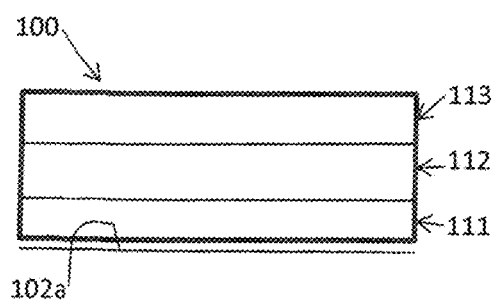
FIG. 2A is a cross-sectional view of the an embodiment of the concrete curing blanket taken along line 2-2 of FIG. 1.
Figure 2B:
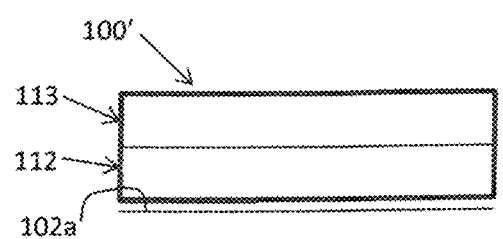
FIG. 2B is a cross-sectional view of the another embodiment of the concrete curing blanket taken along line 2-2 of FIG. 1; and, FIGS. 3-6 are photographs of concrete at various stages of curing in accordance with the present invention.

FIGS. 1, 2A and 2B show a concrete curing blanket 100, for example, of three layers (FIG. 2A), and 100' of two layers (FIG. 2B), resting on a surface 102a of a concrete slab 102. The first layer 111 is a base or contact layer 111 for contacting the concrete surface 102a. This layer 111 is for example, made of a synthetic nonwoven fabric, such as Spun Bonded fabric. Above the first layer 111 is a second layer 112, which is a storage layer. This storage layer 112 is, for example, a synthetic fiber made nonwoven fabric comprising SAP (Super Absorbent Polymer) material coating the fibers in the fabric. Alternately, the nonwoven includes SAP powder dispersed within the fabric, the powder for storing water. The third 113 or uppermost layer, over the second layer 112, is a cover layer. This cover layer 113 is, for example, a synthetic film of high water barrier characteristics, which prevents water evaporation, through the blanket 100.

The three layers 111, 112, 113 are laminated together via heat activated bonding agents, adhesives, or the like.

The contact layer 111 functions to wick water into the blanket 100 via pores of suitable sizes (within the range of approximately 10 to 500 microns) in the contact layer 111. These pores allow for water permeation (e.g., fast water permeation based on nonwoven liquid strike through times of less than 2 minutes), into the blanket's 100 storage layer 112, when the blanket 100 is in contact with the water saturated concrete (when the blanket 100 is spread over the concrete slab, to store and to effectively transfer water back to drying concrete spots from the water saturated blanket during the curing process).

The storage layer 112, by its SAP material, absorbs excessive quantities of the supplied water (up to 1,000 times its weight), due to the high osmotic pressure of the water molecules in the SAP's poly-ionomer (e.g., sodium neutralized polyacrylic, or polyacrylamide polymer), that is balanced by the compressive pressure of the crosslinks in the swollen SAP polymer network. This structure for the SAP restricts the swelling of the storage layer 112 caused by the water uptake. The water molecules stored in the SAP saturate the blanket 100 and the concrete surface 102a, to prevent drying of the concrete. The SAP may be, for example, the material disclosed in U.S. Pat. No. 6,984,419, attached hereto as Appendix A (7 Pages), which is incorporated by reference herein.

The cover layer 113 is an hydrophobic (e.g., polyolefin) film of high water barrier characteristics (very low water absorption and diffusion coefficient) that prevents water evaporation from the blanket 100, to maintain high water activity within the blanket available for supply to the concrete 102 through diffusion to the desiccated (due to the cement hydration), or other water depleted (due to drying) zones in the concrete 102.

In another embodiment of the invention, shown in FIG. 2B, the curing blanket 100' is composed of only two layers, the storage layer 112 and the cover layer 113. With this curing blanket 100', storage layer 112 is in direct contact with the concrete slab 102, wherein fabric configurations of higher tightness (e.g., high thermal bonding nonwoven fabrics) and low linting (continuous filaments) are applied.

The contact layer 111 performs wicking of water and liquid as it is made of a nonwoven fabric of controlled pore sizes. For example, pore sizes are within the range of approximately 50 to 300 microns, with these pore sizes achieved through adjusting the parameters of the SMS (Spunbond-Meltblown-Spunbond) manufacturing method for the non-woven fabric, or any other Nonwoven fabric manufacturing method that control the pore size in the fabric.

The pore sizes of the contact layer 111, e.g., from 1 to 1000 microns, are capable of high water wicking, rates within the range of 10-60 seconds. This wicking rate is much greater than with conventionally known cellulose wicking layers.

The fabrics, e.g., SMS, of the contact layer 111 may be coated with suitable detergents designed for enhancing the wicking performance of nonwoven fabrics (e.g., Silastol™ 163 made by Schill & Zeilacher of Germany).

It has been demonstrated that the combination of suitable pore size distribution within the fabric and wicking finish application to the surface of the fabric can increase the wicking performance to very high wicking rates characterized with "Cover Sheet Strike Through" test values within the range of 5-10 seconds.

The storage layer 112 serves in deswelling of the water saturated SAP from the storage blanket 100 to the concrete. The storage layer 112 supplies the required water for the energetically favorable hydration reaction of Calcium and Silicon oxides in the cement to form the solid calcium silica hydrate (CSH) in the concrete during the curing stage.

The supply of water molecules from the SAP to the concrete, against the osmotic pressure in the SAP, is driven thermodynamically by the free energy release of the water hydration reaction with the cement in the concrete. As a result, the supply of water from the blanket 100 is stochiometrically used for curing the cement, leaving no extra water supply, that could affect adversely the concrete strength.

The supply of vapor water molecules from the swollen SAP is enhanced by the osmotic pressure in the SAP, which increases the chemical potential of the water in the SAP through higher pressures.

Figure 3:

The excessive water vapor that is supplied into the sealed blanket 100 accumulates between the impermeable cover layer 113 at the top of the blanket 100 and the concrete slab 102 at the bottom of the blanket 100, forming high relative humidity levels, which saturate and condense into liquid water droplets, typically on the hydrophobic cover layer 113. The hydrophobic cover 113 is, for example, a film, which reacts as a nucleant to form the liquid phase as droplets on it, that accumulate as downward flowing water (toward the concrete surface 102), as shown in FIG. 3.

The water condensation on the film of the cover layer 113 is affected by using cooler transparent or white films, and by coating the film with water nucleating agents, for example, silver iodine. For example, with transparent or translucent cover layers 113, liquid, e.g., water, droplet (drops) accumulation on the film is observable, as shown in FIG. 3.

The liquid drops merge into a liquid water phase that saturates the blanket 100. The extra liquid water fraction that is not being absorbed into the concrete capillaries, for wetting the concrete and for the hydration reaction, is absorbed into the storage layer 112, and reswells the water absorbent SAP in the storage layer 112.

Repeating the processes of evaporation/condensation/reswelling of the water generates a "reflux" cycle of the water that was originally absorbed into the SAP to the storage layer 112, during the blanket cover stage, to effectively saturate the concrete layer 102, without evaporation losses into the atmosphere, typically for extended periods of time. The condensation of water vapor during condensation to droplets on the cover layer 113 reduces their vapor pressure, and prevents evaporation into the atmosphere, retaining the water in the storage layer 112 for longer concrete curing times.

As the temperature within the storage layer 112 increases, the vapor pressure in the SAP increases, causing faster liquidation of water on the film barrier in the cover layer 113, saturating the blanket 100, 100' with higher contents of liquid water and keeping the concrete at a higher degree of humidity, such as approximately 90-100 percent humidity. Additionally, the temperatures inside the blankets 100, 100' increase via a "green house" effect, as generated by the cover layer 113, within the blanket 100, 100'.

Additionally, the "reflux" process in the blanket 100, which supplies water from the SAP to continually saturate the blanket 100 and diffuse to the concrete capillaries, can be utilized for hydration of dry chemicals in the blanket 100 to hydrate, dissolve and mobilize the chemicals, through diffusion with the water, into the pores of the concrete surface 102, for reaction with the concrete.

This water "reflux" process allows for the surface treatment of slabs and concrete elements with typical surface finishing admixtures, such as sealers and hardeners, that, for example, are incorporated as powders into the storage layer 112 of the blanket 100, 100'. The sealers and hardeners are effectively administrated to the concrete base 102 for the required surface treatment as described above. Sealers include, for example, Lithium Silicate, while hardeners include, for example, micro silica. Concrete admixtures and chemicals may also be administered to the concretes, and may include, for example, anti-efflorescence ion exchangers, concrete crystalline sealers, colloidal silica, various pigments, accelerators, and other related concrete additives.

The cover layer 113 is such that it has transport properties of water transmission WVTR lower than 4.6 gm/m$^2$/pascal. The impermeability of the cover layer 113 is increased, for example, by increasing the film thickness, bidirectionaly orientating the film, that reduces diffusion coefficient, as well as tighter adhesion of the cover layer 113 to the storage layer 112, and higher overlap between the blankets 100, 100, for better sealing of the blanket 100, 100' over the concrete slab 102.

The sun light radiation transport properties through the cover layer 113 may be manipulated via compounding with silica, in order to affect the temperature within the blanket.

As discussed above, higher temperatures are required in order to increase the vapor pressure and enhance the water "reflux" process.

Higher temperatures, in combination with high humidity, also accelerate the cement hydration reaction (concrete steaming effect). This reduces the "open time" of concrete casts in slabs and molds and other pre-cast applications. This effect is important especially under low temperature conditions, because of the low hydration rates.

Control of the cover layer 113 film interactions with solar radiation is used to heat the internal layers of the blanket and to generate a "Greenhouse" effect within the blanket. This is achieved as the transparent films allow the solar radiation to penetrate and heat the fibers of the storage layer 112 and SAP, generating the heat internally, and maintaining it inside the blanket 100, 100'.

The effect can be further enhanced via incorporation of "green house" effect silica additives to the film (e.g., 10% over weight of film) of the cover layer 113, which transfer the NIR (near infra-red) radiation from the sun into the blanket 100, 100', and absorbs the FIR (far infra-red) radiation that is reflected back from the storage layer 112.

Higher SAP temperatures substantially increase its vapor pressure with an average vapor pressure increase of approximately 35%, for a temperature increase of approximately 5 degrees C. over ambient external temperatures of around 25 degrees C. Black coloration of the internal layers of the blanket 100, 100', enhances absorbance and reflectance of the solar radiation inside the blanket 100, 100'.

Cover film adjustments for lowering the blanket's 100, 100' temperature, in the case of requirements for lowering the concrete temperature, are possible via white pigments (e.g., Titanium Dioxide at weight concentrations of 0.5%-10.0%) that are dispersed in the film of the cover layer 113, to scatter the sun light and prevent its penetration and heating of the curing blanket 100, 100'.

The combination of the three layers 111, 112, 113 results in a blanket 100, which maintains high moisture content in the concrete for long periods of time, and supplies adequate water for the required curing.

The high vapor pressures in the swollen high osmotic pressure and high temperature SAP in the storage layer 112 effectively fill the sealed blanket 100 volume with high activity water, of relative humidity levels near 100%, which saturate and nucleate into liquid droplets on the hydrophobic films or other surfaces in the blanket or on the concrete surface that is in contact with the curing blanket.

The excessive liquid water, that had not been consumed for the hydration of the cement in the concrete, is swollen back into the SAP and maintained in the blanket. This combination of high swelling and deswelling of water from the SAP in the storage (reservoir) layer 112, with the effective sealing of the blanket 100 with the cover layer 113, is highly effective in preventing water vapor loss to the atmosphere and drying of the blanket. This allows for long times of high relative humidity in the concrete under the curing blanket 100.

The contact layer's 111 water wicking performance is utilized effectively to transfer water to the SAP (in the storage layer 112) from the saturated concrete during the concrete covering stage, and to transfer water back to the concrete during deswelling for the hydration reaction of the cement during the curing stage. The contact layer 111 has increased wicking rates (when compared to wicking rates in conventional concrete blankets).

Maintaining water saturation at the storage layer for extended times, and the ability to supply large liquid water quantities to saturate the concrete, are being utilized for transport of concrete admixtures from the storage layer 112 to the concrete (e.g., calcium hydroxide, colloidal silica, Lithium Silicate, Potassium Silicate, Sodium Silicate, silanes, siloxanes pigments, and the like). The admixture chemicals that are mixed within the SAP matrix (of the storage layer 112), that coats the nonwoven's filaments, or dispersed in powder form within the nonwoven fabrics, are extracted by the condensed water, and diffuse with the water through the concrete 102. Capillaries in the contact layer 111 interact with the concrete surfaces 102a, bringing about the required admixtures surface treatment that is superior to the conventional non-reactive concrete blankets.

SAP Applications to Bond the Curing Blanket to the Concrete

Based on field trials, it was found that SAP impregnated Nonwoven fabrics at contents of approximately 10 to 100 grams/square meter form strong bonds when in contact with the covered concrete. It is believed that this is related to suction of the SAP swollen gels by the concrete capillaries that are wetted via the lower surface tension hydrophilic SAP. The strong bond that is generated attaches the blankets 100, 100' firmly to the concrete 102, stabilizing the blankets against environmental elements, such as wind, and facilitates covering of vertical concrete elements.

Controlled SAP ionomer content and cross linking density are implemented in order to achieve suitable wetting and viscosity balance, as well as modulus and yield strength of the SAP, for optimal wetting of the concrete versus debonding of the SAP from the concrete, leaving it on the blanket 100, 100' after detachment of the blanket 100, 100' from the concrete surface 102a. The direct contact between the SAP and concrete 102 enables transfer of chemicals from the SAP directly to the covered concrete 102 in admixtures to the concrete.

Layer Enhancement

The contact layer 111 is such that wicking capability is maximized by controlled pore size distribution and by coating the fabric with surfactants, such as Silastol™ 163. The storage layer 112 includes high SAP contents, such as cross-linked sodium neutralized polycarylic acid. Additionally, admixtures and concrete additives may be incorporated into either to the SAP (of the fabric) before cross linking, by wet impregnation, or in dry powder form mixed with the SAP powder during dry impregnation of the fabric. Additionally, coloring the nonwoven fabric of the storage layer 112 with black colors increases sunlight (solar radiation) absorption.

The cover layer 113 is such that it has increased water impermeability and increased light transparency. Silica additive in the cover layer 113 causes the "green house" effect. The cover layer 113 is, for example, black in color for irradiation heating, and pigmented with white Titanium Dioxide for light reflection and cooling.

Manufacture of the Curing Blanket

Manufacture of the cover layer 113 includes, for example, single or multi-layer film casting, with optional compounding of the polymers with black or white pigments, or with irradiation transfer controlling agents, such as Silica powder (5%-10% over weight of resin). The cover layer 113 is bound to the storage layer 112 by an extrusion coating process, continually following the stage of SAP impregnation of the storage layer 112.

The storage layer 112 is made by introducing SAP Material into the fabric by methods including continuous coating of the fabric by solution polymerized SAP, compressing the SAP into the fabric, and drying the coated fabric. Continuous coating of the fabric may be performed by using the aqueous SAP system of H. B. Fuller, as disclosed in H. B. Fuller PD8081H Technical Data, attached hereto as Appendix B (Two Pages). This involves in situ cross linking of the SAP polymer solution during impregnation, compressing and drying the coated fabric.

A third method includes spreading of the dry powdered SAP particles (approximately 20-1,000 Microns MD (median diameter)) between two nonwoven fabrics at densities sufficient to maintain the powder particles in between. This is followed by adhesive bonding of the two fabrics to form an integral sandwich type of SAP particles bound between the two fabrics. The SAP fibers blend into the nonwoven fabrics, when the nonwoven fabrics of the storage layer 112 are composed of blends of approximately 30%-100% Super Absorbent Fibers.

Manufacture of the storage layer 112 includes dispersion of dry Powders of SAP (approximately 20-2,000 microns MD in felt), stitching or needle punching the powder-impregnated felts to maintain the powder encapsulated inside the integrated fabric. Dry powders of SAP (50-1,000 microns MD) may be dispersed into the fabrics via the Fibroline™ process, as disclosed in www.Fibroline.com and Appendix C, attached hereto (3 Pages), are used in the storage layer 112. Admixture chemicals are incorporated into the Nonwoven fabrics within the storage layer 112, by one of the following methods:

a) Mixing of dispersions of the chemical admixtures within the SAP Polymer Solution at speeds of approximately 20-100 rpm, or within the Aqueous SAP system of H. B. Fuller, followed by the fabric impregnation, to incorporate the chemicals admixtures dispersions within the cross linked SAP that coats the fabrics;

b) Spreading blends of the dry powder particles of the chemical admixtures mixed with the dry powder SAP particles to be dispersed between bonded layers of the Nonwoven fabric; or, c) Dry impregnation of blends of the dry powder particles of the chemical admixtures with the dry powder SAP particles into Nonwoven stitch bonded or needle punched felts via the Fibroline™ or other powder impregnation processes.

The concrete curing blankets 100, 100' are, for example, used for curing horizontal concrete elements, such as slabs, floors, decks, piers, molds, and the like, and for curing vertical concrete elements, such as walls, pillars, slops, tilt ups, and the like.

In horizontal elements, the cast concrete age should be beyond the final setting time and after the required contraction joints cutting of the slabs and surface finish applications (abrasives, hardeners, sealers, pigments, and the like). The concrete surface should be water soaked and covered with a 2-5 cm thick water layer. During blanket spreading over the concrete surface, extra water can be applied directly into the blanket via sprinkling. The blankets should be spread strip wise, by unrolling them from cylindrical roll wraps. Blanket width dimensions are, for example, within the range of approximately 0.5-20.0 meters, preferably approximately 1.0-10.0 meters. There should be at least approximately 0.30 meters of overlap between adjacent blanket strips. Following placement, the blankets should be compressed to the concrete, via brooms or rolls, to disperse air bubbles out of the blanket/concrete interface.

The cohesion forces between the blanket's wet SAP and the concrete capillaries bond the blanket 100, 100' firmly to the covered surface 102*a*, preventing detachment and stabilizing the curing blanket's position in vertical elements. Fresh concrete in vertical elements is covered with curing blankets that are fastened at their upper points via mechanical anchors, compressed to the concrete surfaces with rollers down to the bottom and bolted to the base of the elements. The cohesion between the blanket's wet SAP and the concrete capillaries causes the blanket to firmly bond to the vertical concrete wall, and stabilizes its position.

Returning to FIG. 2A, the three layers 111, 112, 113 of the blanket 100 are laminated together via a heat activated bonding agent or any other adhesive type, to generate the combined effects of rapid water charging, high water content storing, extended time water release, and concrete moisturizing. This allows for the blanket 100 to supply the required water molecules to complete curing of the dry concrete, typically, approximately 2-4 liters of water per square meter. When covering the water saturated concrete slab 102, the contact layer 111 rapidly wicks the excess water into the SAP material within the storage layer 112, for example, at typical rates of 1 liter per a square meter in a minute, that absorbs the water amount needed to complete curing of the concrete in the slab 102. The water barrier film of the cover layer 113 prevents evaporation of water vapor and maintains high water activity within the blanket 100, which supplies water molecules from the SAP hydrogels to the chemically favorable calcium/silica hydration reaction to form solid CSH for solidification and hardening of the concrete during curing.

Also returning to FIG. 2B, for example, a concrete curing blanket 100, 100' may be of dimensions of at least approximately 0.5 meters in width 10 meters in length.

The concrete blanket 100 may be modified in the contact layer 111 by: 1) coating the Nonwoven fabric with a wicking agent, for example, a non-washable durable surfactant yielding strike-through time values (method NWSP 70.3) of less than 1 minute; 2) controlling the fabric's pore size range within the range of 1 to 1,000 microns; 3) using continuous filaments spun bonded or SMS produced Nonwovens of a high thermal bonding level and low linting levels; and, 4) using perforated films of wicking capacity with the Strike Through range of up to 1 minute, to replace the nonwoven fabric.

The concrete blankets 100, 100' may be modified in the storage layer 112 by: 1) increasing the SAP content in the fabric to above the level of 2 gm/square meter to supply the minimum estimated quantity of water required for curing of 30 MPa concrete 20 cm thick slab with 60× weight water absorbing SAP in the blanket; 2) incorporating reactive chemicals as admixtures for migration into the concrete and for surface treatment of the concrete slab 102 upon wetting of the blanket 100, 100' (e.g., Calcium Oxide, Colloidal Silica, Microsilica, Lithium, Silicate, Potassium Silicate, Sodium Silicate, and, Crystalline Concrete Sealer; and, 3) coloring the layer 112 with a black light absorbing color.

The concrete blankets 100, 100' may be modified in the cover layer 113 by: 1) increasing the water barrier efficiency of the film of the layer 113 by increasing film thickness or using double layer film or bi-oriented film of lower water absorption capacity and low diffusion coefficient yielding film water transmission levels within the range of 2.3-6.3 gm/square meter/Sec./Pascal, at 23 Degrees C. and approximately 85% relative humidity, WVTR (water vapor transfer rate) values; 2) increasing the light transparency of the film with a clear non-delustrant amorphous polymer; 3) coloring the film of the layer 113 with a black light absorbing color; 4) incorporating 5%-15% over weight of polymer silica into the film to transfer NIR radiation into, and to block FIR radiation out of the blanket 100, 100' in order to generate the green house effect within the blanket; and, 5) coloring the film of the layer 113 with white pigments (e.g., Titanium Dioxide) in order to reflect radiation and maintain low concrete temperatures.

The concrete blankets 100, 100' are such that they provide for one or more of: 1) rapidly wicking water from the concrete slab 102 into the storage layer 112, when the blanket 100, 100' is placed over the wet concrete 102, where, for example, Strike Through Rate time values are lower than 1 minute; 2) generating smooth, unstained lint free concrete surfaces after curing; 3) keeping the concrete slabs fully moist after more than 14 days; 4) yielding 14 days cured concrete with compressive strength values greater by 30% relative to the uncovered control concretes; 5) increasing concrete slab's 102 tightness, hardness, and/or impermeability, and/or mitigates dusting, mitigates efflorescence, and/or shrinkage and plastic cracking; 6) increasing the temperature within the blanket by more than 5 degrees C. relative to the ambient temperature, due to the green house effect that takes place within the curing blanket; 7) keeping the temperature in the blanket at no more than 5 Degrees C. beyond the external ambient temperature when the storage layer 112 is coated with white pigments; 8) increasing the water vapor pressures inside the blanket by at least 20% relative to ambient conditions and the relative humidity levels beyond 80%, allowing for a complete wetting of the blanket 100, 100' and for condensation of liquid droplets on its film barrier; and, 9) increasing the temperature within the blanket 100, 100' by more than 5 Degrees C. relative to the external temperature due to the "green house" effect within the blanket 100, 100', that increases the vapor pressure by at least 20% beyond the ambient pressure and water saturation inside the blanket, and at the concrete surface beyond 80% relative humidity.

The concrete curing blankets 100, 100' are designed to be used for curing horizontal concrete elements, such as slabs, floors, decks, piers, molds etc. and for curing vertical concrete elements, such as walls, pillars, slops, and the like. For example, in the aforementioned horizontal elements, the cast concrete age should be beyond the final setting time, following the required slot cutting in the slabs and surface finish application (abrasives, hardeners, sealers, pigments, and the like). The concrete surface 102a should be water soaked and covered with a 2-5 cm deep water layer. During blanket 100, 100' spreading over the concrete plane 102, extra water can be applied directly into the blanket via sprinkling. The blankets 100, 100' should be spread strip wise, via unrolling them from cylindrical roll wraps.

Blanket 100, 100' width dimensions are typically in the range of 0.5-20.0 meters, preferably 1.0-10.0 meters. There should be, for example, at least 0.30 meters overlap (OL in FIG. 1) between adjacent blanket strips. Following placing over the concrete 102, the blankets 100, 100' should be compressed to the concrete 102, via brooms or rolls, to disperse air bubbles out of the blanket 100, 100'/concrete interface. The cohesion forces between the blanket's wet SAP and the concrete capillaries firmly bond the blanket 100, 100' to the covered concrete surface 102a, preventing detachment and stabilizing the position of the curing blanket 100, 100' on the concrete 102.

In vertical concrete elements, fresh concrete is covered with curing blankets 100, 100' that are fastened to the top via mechanical anchors, compressed to the concrete surfaces with rollers down to the bottom and bolted to the base of the elements. The cohesion between the blanket's wet SAP and the concrete capillaries sticks (adheres) firmly the blanket 100, 100' to the vertical concrete wall, stabilizing the blanket 100, 100' on the concrete element, to stabilize its position.

Manufacture of the concrete curing blankets 100, 100' layers 111, 112, 113 for blanket 100 and 112, 113 for blanket 100', includes: 1) calendaring of the three or two layers using high temperature and pressure rolls, to adhere the respective layers; 2) applying heat/pressure sensitive adhesives or any other suitable adhesives system to bond the cover layer 113 to the storage layer 112; 3) single or multi-layer film casting, with optional compounding of the polymers with black pigments or with radiation transfer controlling Silica powder (5%-10% over weight of resin); 4) bonding the cover film of the cover layer 113 to the storage layer 112 via an extrusion coating process continually following SAP impregnation of the storage layer 112; 5) introducing of SAP material into the fabric via one of the methods: a) continuous coating of the fabric by solution polymerized SAP, compressing the SAP into the fabric and drying the coated fabric; b) continuous coating of the fabric by the Aqueous SAP system of H. B. Fuller (Appendix B), which involves in situ cross linking of the SAP polymer solution during impregnation, compression (squeezing) and drying the coated fabric; and c) spreading of dry powdered SAP particles (20-1,000 Microns MD) between two Nonwoven fabrics dense enough to maintain the powder particles in between, followed by adhesive bonding of the two fabrics to form an integral sandwich type of SAP particles bound between the two fabrics.

Using Super Absorbent fibers, the nonwoven fabrics of the storage layer 112 of the blankets 100, 100' are composed of blends of 30% to 100% Super Absorbent Fibers with fiber types including, for example, polypropylene, polyethylene, polypropylene co-polyethylene, or polyacrylonitrile (PAN), Nylon, or, Polyester.

The storage layer 112 may include nonwoven bonded felts, made by processes such as: 1) dispersion of dry powders of SAP (20-2,000 microns MD) within the stitch bonded or needle punched felts during the fabric production in the unbonded raw felts, stitching or needle punching the powder impregnated felts to maintain the powder encapsulated inside the fabric; or 2) dry powders SAP (50-1,000 microns MD) dispersion into the fabrics via the Fibroline™ process (Appendix C), or any other powder impregnation processes, and detailed above. The storage layer 112 may include additional admixture chemicals, to react with the concrete 102, involving one of the following methods: a)

mixing of dispersions of the chemical admixtures within the SAP Polymer Solution, or within the Aqueous SAP system of H. B. Fuller, followed by the fabric impregnation, to incorporate the chemicals admixtures dispersions within the cross linked SAP that coats the fabrics; b) spreading blends of the dry powder particles of the chemical admixtures mixed with the dry powder SAP particles and introduction into the fabric; and, c) dry impregnation of blends of the dry powder particles of the chemical admixtures with the dry powder SAP particles into nonwoven stitch bonded or needle punched felts via the Fibroline™ process (Appendix C) or any other powder spreading process.

EXAMPLES—PART 1

The following examples illustrate the capacity of the invention's curing blankets to maintain high water humidity levels and supply the covered concrete with the required water for curing over extended times beyond 14 days at extremely harsh and at regular weather conditions.

A three layer concrete blanket 100 is provided, and includes the following layers:
Contact Layer 111;
Type: Spunbond Nonwoven fabric made of Polypropylene;
Basis weight: 20 grams/square meter
Pore size dimensions: 200-500 microns
Storage Layer 112;
Type: Spunbond Nonwoven fabric made of Polypropylene:
Basis weight: 80 grams/square meter
SAP Coating content: 20 grams/square meter
SAP Preparation and Coating Following H. B Fuller technology, as disclosed in Appendix A, of aqueous Super Absorbent Polymer (SAP) system: PD8081H supplied by H. B. Fuller, is cross linked with Ammonium Zirconium Carbonate solution in water, Bacote 20 supplied by MEI, and is applied to the Nonwoven fabric via wet impregnation, padding and drying. A solution of sodium neutralized acrylic acid polymer of the PD8081H in the bath is cross linked by the Zirconium of the Bacote 20 in situ during impregnation of the fabric. At room temperature, white SAP film is forming on the fabric that further dries to form SAP coated fabric.

Cover Layer 113 includes a low density polyethylene film of thickness 50 microns. Water transmission is: WVTR 2.5 gram/square meter/24 hours at 23 degrees C. and 85% relative humidity.

Blanket Production:

The nonwoven fabric of the storage layer 112 under goes impregnation in a bath containing ingredients as described before, is compressed, and merged with the nonwoven fabric of the contact layer 111 that is fed from a parallel roller above it. Both merged fabrics go through a 120 degrees C. air circulated drier for 30 seconds residence time and roll together on a storage Bobbin.

The two merged fabrics are then covered by the third cover layer film 113 that is continually fed on them. The cover layer film 113 is glued to the two merged layers 111, 112 with discontinuous dots of pressure sensitive adhesive, which is dispersed between the fabrics before their contact point, and then compressed between the film 113 and Nonwoven fabrics layers 112 by hot compressive rolls. The final blankets were rolled on 1.2 meter cylinders.

Blanket Mechanical Properties:
Caliper: 0.8 mm
Tensile: TD: 80 N/5 cm
MD: 120 N/5 cm
Elongation: TD: 70%
MD: 70%

Concrete Curing Test

The concrete curing blanket 100 was used in curing a 500 square meter floor for a compost processing factory at the "Or Compost" regeneration industrial park in the Jordan Valley of Israel. The floor is designed for fork lifts and heavy duty vehicles. The floor is 30 cm thick and reinforced with welded wire fabrics as well as rebars, suitable to overcome the prescribed loads. The concrete was a standard B 30 concrete of 350 Kg/cubic meter cement and water to cement ratio of 0.45. Standard practices of ground tightening, casting and laser screeding were observed.

After the final setting, the floor was cut to contraction spacing of 10 meters by 7 meters. The curing blankets were laid following the floor cutting. The floor was saturated with water at a depth of 2.0-3.0 cm. A 1.20 meter wide blanket was unrolled from wrapped cylinders into the top of the floor. The blankets immediately stuck (adhered) to the concrete floor and rapidly adsorbed the water. Extra water was added through a hose in front of the unrolling line to maintain water saturation. Strips of the blanket were laid in parallel with a 30 cm overlap between the adjacent blankets.

Following placement of each group of 5 layers, the blanket was squeezed (compressed) a soft squeeze, to disperse trapped air bubbles out of the interface between the blanket and the floor. About 200 square meters of the floor were not covered, in order to serve as a control.

Test Conditions

Weather conditions during the period of 26 days in the location were extremely harsh with typical desert temperatures between 35 to 40 degrees C., relative humidity of 50%-70%, and strong winds during the evenings. The floor was in an open area, exposed to sunlight and wind. The blanket stuck (adhered) firmly to the concrete. Steel bars were put in the margins of the floor on the blanket to secure it to the floor. There was no detachment of the blanket from the floor throughout the test period, in spite of the strong winds.

Observation after 7 days, 14 days and 26 days showed saturation of the blanket throughout all the period with water droplets accumulation on the transparent film of the cover layer inside the blanket prevailing throughout the 26 days (FIG. 3).

Figure 4:

The covered concrete kept high humidity levels under the water saturated blanket. The concrete dried rapidly and quickly lost water, once the blanket was removed for testing the humidity (FIG. 4). The uncovered control dried out within less than a week and developed plastic shrinkage cracks. The covered concrete did not generate any cracks after removal of the blanket and maintained a smooth, tight structure without efflorescence contamination.

Two Layer Concrete Curing Blanket

The blanket 100' is similar to the previous three layer curing blanket, without the contact layer 111. The blanket 100' included a storage layer 112 and a cover layer 113, manufactured in the same manner as the blanket 100 detailed above. The layers 112, 113 were bonded together through hot calendering of the two layers with dotted points of pressure sensitive adhesive in between the layers.

Blanket Mechanical Properties
Caliper: 0.7 mm
Tensile: TD: 100 N/5 cm
MD: 160 N/5 cm
Elongation: TD: 70%
MD: 70%

Concrete Curing Test

The concrete curing blanket 100' was used in curing a 100 square meter indoor floor on a basement of a warehouse at the Bar Lev Industrial Park in Israel.

The floor is designed for fork lift traffic. The floor is 20 cm thick and reinforced with steel fibers at the dosage of 35 Kg/Cubic meter without the need for contraction joints. The concrete was a standard B 40 concrete of 400 Kg/cubic meter cement and water to cement ratio of 0.50. Standard practices of ground tightening, casting, and laser screeding were observed.

The curing blanket was laid following a helicopter smoothing: The floor was saturated with water at water depth of 2.0-3.0 cm. A 1.20 meter wide blanket was unrolled from wrapped cylinders into the top of the floor. The blanket was tightened with a broom to the concrete floor in order to adhere the blanket to the floor. Strips of the blanket were laid in parallel with a 30 cm overlap (OL in FIG. 1) between the adjacent blankets. About 100 square meters of the floor was not covered to serve as a control.

Test Results

Figure 5:

Temperature and humidity conditions were normal at 25-30 degrees C., and humidity levels of 75%-85%. After 7 days and 14 days of curing the underlying concrete, the blankets were still saturated with accumulated water drops on the barrier film layer (cover layer 113). The concrete under the curing blanket was saturated with very high relative humidity. Taking off the blanket following 14 days, the cured concrete was uncracked and smooth with a minor degree of efflorescence (FIG. 5).

In contrast, the uncovered concrete reference floor dried within less than 7 days, had some plastic cracks and high degrees of white efflorescence.

Figure 6:

The storage layer 112 touching the concrete formed strong bonding spots on the concrete via SAP adhering to the concrete capillaries at multiple points. Upon detachment of the blanket 100' from the concrete surface, some of the SAP remained in the concrete and was removed by water sprinkling (FIG. 6). This suggests the potential of using a two-layer blanket with SAP contacting the concrete, in order to develop a strong bond between the blanket and the covered concrete, in horizontal and vertical covering configurations.

II. Anti-Bacterial Textile Fibers

The present invention provides for protection of textiles that contain polyamides comprising amino end groups by using transition metal cations capable of chemical interactions through complex coordination and electrophilic bonds formations with the amino end groups of the polymer. This provides for higher stability of the metal cation on the fiber surface, for longer and more stable protection.

Using partially oriented yarn (POY) (e.g., non drawn-texturized fibers) as the polyamide complex metal or cation carrier, there is achieved higher accessibility and efficiency of the transition metal or cation. Also, the low contents of reactive fibers inside the textile structure allow for lower costs and easier textile manufacturing, and the small amounts of transition metals or cations in the textile fabric result in a lower environmental impact. The invention provides a quorum sensing mechanism of protection, resulting in lower consumption of transition metals or cations by the environment.

A combination of physical and chemical principles is being used in the invention to produce polyamide fibers of effective antibacterial protection for textiles, with low contents of biocides.

The transition metals, which are known as effective antibacterial agents, are dispersed within polyamide fibers through injection of master batches of the metal in polymer concentrates, into the polymer in the extruder during melt spinning. This process disperses the metal particles within the fibers. When exposed to ambient conditions, the metal particles undergo solid state migration to the surfaces of the fibers, forming higher concentrations at the surfaces of the fibers. This equilibrates the polymer's vapor pressure and chemical potential within the fibers. This process continually supplies the needed metal particles from the bulk of the fibers to the surface, as the metals are depleted to the protected environment. This process constitutes an internal controlled release mechanism of the metal ions from inside the fibers to the protected environment. The metals at the surface are oxidized to form transition metal cations, which function as biocides.

Following the significant complex formation constants of transition cations with amines (e.g., in silver cation/ethyl amine complex, where K=2,340), and the high affinity of the Nucleophilic amino groups to the metal cations, the metal cations at the surface of the fibers form complexes and electrophilic bonds with the amino end groups of the polyamide polymers. This stabilizes the metal cations on the fiber's surface against migration into the aqueous environment around the fibers, restricting their dissolution in the surrounding water to low concentrations, and increasing their stability towards laundry washing cycles.

Only firm contact between the bacteria and the fiber surface facilitates the metal transfer from its stable state in the fiber, to another energetically favorable bound state within the bacteria, to kill the bacteria in a "contact killing" mechanism.

The inventors observed that the anti-bacterial protection in the fibers/textiles lasts for long time periods. There is no detectable loss of metals from the fibers, and the antibacterial protection is effective at low concentrations of metals in the fibers relative to the quantities of measured bacterial loss. There was no detection of equivalent metal losses.

The stability of the anti-bacterial protection by the transition metals in the polyamide fibers is uniquely high. This suggests that the protection mechanism does not involve only "contact killing" with equivalent metal transfer to the bacteria, but rather, also involves either consumption of very small dosages of the dissolved metal in the water, that are highly effective bacteria killers, or, no transfer of metals at all, in a mechanism that is based on a "quorum sensing" effect within the bacteria community. This "quorum sensing" effect prevents the bacterial settling on or near the fibers' surfaces, and halts their multiplication in the protected textile. The bacteria sense the metal biocides on the fibers' surfaces, and detect each other's signals, not to settle or multiply there, through their "quorum sensing" communications system.

The inventors discovered that the higher the antibacterial efficiency of the metal, the higher is the sensitivity of the bacteria to the metal that can be used at lower contents in the protected fabric. Additionally, the inventors discovered that silver cations are highly effective antibacterial agents, yielding protection at extremely low concentrations in textiles for long times and at high fastness.

In the following embodiments the principles of the invention are illustrated.

The fiber formation involves standard Nylon 6.6 POY melt spinning procedure that includes master batch injection through a pressurized additives port in the extruder, allowing for the introduction of the silver metal into the fibers.

Textile Nylon 6.6 polymer of relative viscosity within the range of 35-45, and typically 40, containing 0.3% delustrant is melt spun at speed within the range of approximately 4,500-5,500, and typically 5,000 meters/minute to generate POY fibers of 3.2-4.2, and typically 3.8 grams/dtex tenacity and 70%-90%, and typically 76%, elongation. The fibers dtex/filaments count is 50/40, with dtex per filament 1.25, which is within the microfibers range.

During extrusion, the polymer is injected with a silver metal containing master batch designed for uniform and high dispersion in the Nylon 6.6 polymer via long residence times 2-6, and typically 4, minutes in the extruder. In the Master Batch, the carrier of the silver particles is Nylon 6. Some of the silver particles are of nanosizes, such as less than 0.5 microns.

The dosage of the master batch in the polymer is within the range of 1.3%-2.0%. The Master batch type is SUKANO PA am S652, made by Sukano AG. The spun POY fibers are spin finished with 0.2%-0.6% (typically 0.3%) oil on yarn. The silver concentration in the extruded fibers is within the range of approximately 1,500-4,500 parts per million (ppm).

A typical POY fiber with parameters within the above range is produced by Nilit Ltd. of Migdal Haemek, Israel, and is commercially available as a 50/40 dtex/filaments count POY yarn. These POY fibers are designed to be drawn texturized to 40/40 dtex/filaments count DTY (Draw Textured Yarn) and used as typical draw texturized yarns in knit wear for antimicrobial protection of the textiles against body perspiration and smell, under the trade name "Body Fresh". The protected knitted fabrics contain either 100% Body Fresh fibers, or are blended with regular Nylon textured yarns in contents greater than 40%. In the invention, the above silver including POY (non texturized) fibers are used as blends in contents lower than 10%, to protect textiles against bacteria.

The above produced POY fibers were cut to 12 mm cut length staples. The cut fibers were blended with a mix of regenerated polyester and viscose cut fibers (for example, in a web), carded and further stitch bonded via a stitch bonding operation to a nonwoven fabric of 280 grams/square meter fabric specific weight via a polyester 150/1 yarn with a 7 gauge needle stitch bonding machine. The Nylon POY reactive fibers contents in the blends of the fabrics were 5.0% and 1.0%. The aforementioned POY fibers including stitch bonded non-woven fabrics, are known hereinafter as "treated stitch bonded fabrics". The two Treated Stitch Bonded fabrics along with an untreated Stitch Bonded fabric control fabric, were subjected to bacterial resistance test following the American Association of Textile Chemists and Colorists AATCC 100-2012 standard test for assessment of antibacterial finishes on textile materials for the AATCC 25922 *Escheichia coli*.

As illustrated in Appendix D (3 Pages), attached hereto, in the Figure entitled: Treated Viscose floor cloth Silver coat, both the 5.0% and the 1.0% reactive fibers containing fabrics passed the test criteria, showing the required three logs reduction of the bacteria counts after 24 hours, which lasted for the following 26 days of the test. There is a small difference between the samples of 5.0% and the 1.0% reactive fibers contents. This implies that reaching the minimum required level of silver concentration in the textile reassures the protection. There is no need for additional silver, since the protection does not seem to be stoichiometric with the amount of silver. As soon as the bacteria sense the silver, they stop multiplying and lose population. This confirms the assumption that the protection is via non-contact "quorum sensing" mechanism. At 1.0% reactive fibers content in the fabric, with silver content of 0.15% in the fibers, the overall silver content in the protected fabric is 15 ppm. Testing the fastness of the draw texturized silver containing Nylon 6.6 fibers gave very high values, that indicated the strong cohesion between the silver cations and the Nylon 6.6 fibers. Draw texturized Body Fresh knits from Nilit Ltd. made of the same type of POY fibers, as disclosed above, were tested for stability against laundry washings following the standard method of AATCC 100-2012. After 50 cycles of 60 degree C. laundry washings, the knits still showed more than 99.9% reduction of bacteria in the standard anti bacteria test, which it was subjected to. This illustrates the stability of the silver bond to the Nylon 6.6 fibers, that provides high fastness. These embodiments show outstanding anti-bacterial efficacy and durability of the fibers disclosed herein, that facilitates protection of textiles in blends with very low reactive fibers contents and extremely low concentrations of silver. These results for the invention are in favorable comparison with other antibacterial systems that require much higher biocide concentrations. For example, nano-particle silver is with 30 to 100 ppm, zeolite particle silver is with 80 to 300 PPM, fiber embedded silver is with 2,500 to 5,000 PPM, Triclosan is with 1,000 to 5,000 PPM, and quaternary amines are with 1,000 to 10,000 PPM.

Silver containing Nylon 6.6 partially oriented yarn (POY) fibers, such as those from Nilit, Ltd., as detailed above, have been blended within fabrics, such as nonwoven fabric of 280 grams/square meter fabric specific weight via stitch bonding with a polyester 150/1 yarn as discussed above to generate fabrics, known as "treated stitch bonded fabrics", at low concentrations for anti-microbial activity. Other embodiments are directed to concentrations of silver in the fabrics, which are low, but provide sufficient antibacterial properties.

To produce fabrics, with low yet effective levels of effective silver metal and/or cation(s), which are required to protect the fabrics against bacteria, low contents of Silver metals and/or cations were introduced into the POY Nylon 6.6 fibers and to the Treated Stitch Bonded fabrics that contain the fibers produced by the same methods as disclosed above. For example, the Silver containing POY fibers, i.e., 50/40 dtex/filaments count were cut to 12 mm cut length staples. The cut fibers were blended with a mix of regenerated polyester and viscose cut fibers, carded and further stitch bonded to a nonwoven stitch bonded fabric of 280 grams/square meter fabric specific weight via a polyester 150/1 yarn with a 7 gauge needle stitch bonding machine.

In the fabrics, the silver particles include one or more of silver metal or silver cations, for example, within zeolites or silicon dioxide carriers or Silver Sodium Zirconium Hydrogenphosphate, and/or silver salts, such as silver nitrate. These silver particles are of sizes with a median diameter range of approximately 10 nanometers (nm) to approximately 100 microns, and, for example, approximately 50 nm to approximately 10 microns, and, for example, a range of approximately 10 nm-500 nm (0.5 micrometers).

EXAMPLES—PART 2

In the following Examples 2A and 2B, POY fibers from Nilit (50/40 dtex/filaments count POY yarn), having a tenacity within the range of approximately 3.0-4.5 grams per dtex and elongation within the range of approximately 60%-90%, were used.

EXAMPLE 2A

POY Nylon fibers (Nilit 50/40 dtex/fillaments count POY yarn) were charged with 20 ppm Silver (in metal and/or cation forms) and blended in a stitch bonded fabric at very low weight percentages, for example, of 5%, 1% and 0.5%, over weight of the fibers of the fabric, to yield extremely low overall contents of 1.0, 0.2 and 0.1 ppm of Silver metal and/or cation, over the weight of the fibers in the fabric. The Silver includes Silver metal and/or Silver cation particles, for example, of less than 0.5 microns median diameter.

These extremely low level concentrations of Silver in the fabric required special analytical techniques, such as ICP-MS (Inductive Coupled Plasma Mass Spectroscopy), for their quantitative characterization. The quantitative characterization serves to determine the exact concentration of silver in the fabrics.

The level of Silver concentrations below 1.0 ppm is below the threshold limit of biological activity of the silver, with a very low human risk assessment according with EC BPR: Biological Products Regulations Articles 3, 19, 69 of the United States Environmental Protection Agency EPA Reg. 85249-1, and other regulations, that permit the usage of fabrics containing silver within this range of concentrations.

The regulations permit the distribution of the fabrics containing the silver at concentrations below 1.0 ppm (inclusive) in the market under labels that describe them as "Non Biocidal Products" as per the EC BPR.

EXAMPLE 2B

Treated Stitch Bonded fabrics that contain 1.0, 0.2, and 0.1 ppm silver, via blending of the 20 ppm silver containing POY fibers (Nilit 50/40 dtex/filaments count POY yarn) at concentrations of 5.0%, 1.0% and 0.5% over the weight of the fabrics respectively, were produced as described in the previous embodiments (above) as, for example, POY fibers (as detailed above), which were cut to 12 mm cut length staples. The cut fibers were blended with a mix of regenerated polyester and viscose cut fibers, carded and further stitch bonded to a nonwoven fabric of 280 grams/square meter fabric specific weight via a polyester 150/1 yarn with a 7 gauge needle stitch bonding machine. The Silver includes Silver metal and/or Silver cations of diameters less than 0.5 microns median dimeter.

Test Results

The treated stitch bonded fabrics produced in accordance with the Example immediately above were subjected to the America Association of Textile Chemists and Colorists (AATCC) standard 100-2012 test, for their anti-bacterial activity against the gram positive and gram negative bacteria. The bacteria included, for example, *Staphylococcus aurus* AATCC 65387, *Escheria coli* AATCC 8739, and, *Klebsiala pneumania* AATCC 11296.

Testing the 1.0 ppm Silver containing fabrics at the TUVRHEINLAND LGA product GmbH laboratory (Appendix E1) for ALDI SUD's "Clear Grip fabrics" showed long lasting bacteriocitic activity against all three above listed bacteria of the test, where the bacteria was killed within 24 hours with reduction values of: *Staphylococcus aurus*—99.99%, *Escheria coli*—99.98%, and, *Klebsiala pneumania*—99.99%.

The 0.2 ppm Silver containing fabrics were tested for inoculation of the *Escheria coli* at the Industrial Biology Expertise and Solutions Ltd. laboratory: Test No. 22-24, 17 Jul. 2019 (that is provided in Appendix E2 and Appendix E3 following the AATCC 100-2012 test procedure, showing : Bacteriostatic Percent Reduction of 99.97% and Bacteriostatic Log Reduction of 3.3 that is considered a Strong reduction where the bacteriostatic anti-bacterial activity is defined as "anti-bacterial activity that stops the metabolic activity of the bacteria that terminates the growth and multiplication of the bacteria, but does not kill the bacteria" and Bacteriocitic growth reduction value of 3.3, that is graded as "significant" according to the industry standard DIN EN ISO 20743:2013 Appendix F assessment criteria.

The 0.1 ppm Silver containing fabric that was tested at the Industrial Biology Expertise and Solutions Ltd. Laboratory Test No. 22-24, 17 Jul. 2019 (that is submitted in the Appendix E2 following the AATCC 100-2012 test procedure, for inoculation of the *Escheria coli* Anti-Bacterial test report, shows In the graph of Appendix E3 weak anti-bacterial activity, with an increase of the bacteria population with time and with a Bacteriostatic percent reduction of 93.4%, Bacteriostatic Log reduction of 1.1 that is considered a weak reduction and Bacteriocitic growth reduction value of 1.9 that is graded as "slight" according to the industry standard DIN ISO EN 20743:2013 Appendix F assessment criteria.

Further testing of the 0.2 ppm Silver containing fabrics at the CONSUMER TESTING LABORATORIES Inc., Lab Report No.: ARSL2041793 Issue Date: Mar. 31, 2020, submitted in the Appendix E4, for inoculation of the *Staphylococcus aureus*, and the *Klebsiala pneumania* bacteria showed anti-bacterial activity against the *Staphylococcus aurus* with a 24 hour reduction value of 99.91% and growth reduction value of 4.88 that is defined as "strong" according to the industry standard DIN ISO EN 20743:2013 Appendix F assessment criteria.

In contrast, the test gave no anti-bacterial activity against the *Klebsiala pneumania* without any reduction of the bacterial population after 24 hours a reduction that gave a growth reduction value of Zero.

The results indicate an overall anti-bacterial activity of the fabrics containing Silver within the concentration range of 0.2-1.0 ppm with the following dependence of the biocidal activity versus the Silver content in the fabrics:

At 1.0 ppm Silver—A strong bacteriocitic and bacteriostatic activities against all types of bacteria that were tested. At 0.2 ppm Silver—A strong Bacteriocitic activity against *Staphylococcus aurus* bacteria, a strong Bacteriostatic and bacteriocitic activities against *Escheria coli* and no anti-bacterial activity against *Klebsiala pneumania*. At 0.1 ppm Silver—a weak anti-bacterial activity against all the types of bacteria. The anti-bacterial activities are determined by authorized laboratories according to the Industrial standard testing procedures following AATCC 100-2012 standard test method and the DIN ISO EN 20743:2013 Appendix F assessment criteria.

At this range of extremely low Silver concentrations in the fabrics (i.e., Silver concentrations lower than the average content of Silver in sea sand of 2.0 ppm and at the maximum threshold limit of silver in the air of 0.2 ppm), the fabrics are considered safe with very low risk assessment values and are certified for marketing to various textile applications as: "Non Biocidal", in accordance with the European BPR and the United States Environmental Protection Agency standards, detailed above.

According with the above tests results, the fabrics containing Silver at the concentrations range of 0.2-1.0 ppm have been shown as having anti-bacterial activity, because of reduction values beyond 99% and growth reduction values beyond 2.0—that are graded within the "significant to strong" anti-bacterial activity range., in accordance with DIN ISO EN 20743:2013 Appendix F assessment criteria. The fabrics with the silver concentration range of 0.2-1.0 ppm are therefore defined as "Non Biocidal with Anti-Bacterial Activity". The anti-bacterial activity of the fabrics at such low silver contents may be achieved by the above-mentioned "Quorum Sensing", where the bacteria sense the presence of the silver on the large surfaces of the silver containing micro fibers and signal each other not to settle and multiply on the fabric. This "Quorum Sensing" appears to be a non stoichiometric process that explains the efficiency of such low silver contents in the biocidal process. Another explanation might be related to the high sensitivity of the bacteria to silver based on the specific bacteria's tendency to absorb silver and concentrate it within their proteins from very dilute solutions, for example, as described in Charley, R. C.; Bull, A. T., Arch Microbial (1979) 123, 2391, this publication is incorporated by reference herein.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. An antibacterial textile comprising:
    polyamide polymer fibers, each fiber of a Partially Oriented Yarn (POY) type comprising:
        at least 35 milliequivalent per kilogram (Kg) amino end groups;
        at least one of: a) Silver metal particles, and b) Silver cation particles; and
        the amino end groups and the at least one of: a) the Silver metal particles, and b) the Silver cation particles, dispersed within the polymer of the fiber at a weight content within the range of approximately 10-100 parts per million (ppm);
    wherein said each fiber comprises a tenacity within the range of approximately 3.0-4.5 grams per dtex and elongation within the range of approximately 60%-90%; and
        the polyamide polymer fibers are blended inside a textile fabric, the polyamide polymer fibers at a weight content within the range of approximately 0.5%-40.0% of the fibers of the textile fabric, such that the content of the Silver metal particles and/or Silver cation particles in the textile fabric is within the range of approximately 0.2-45.0 ppm, whereby the textile fabric is antibacterial in accordance with the American Association of Textile Chemists and Colorists (AATCC) 100-2012 standard.

2. The antibacterial textile of claim 1, wherein the Silver metal particles and/or the Silver cation particles are of diameters less than 0.5 microns median diameter.

3. An antibacterial textile comprising:
    polyamide polymer fibers, each fiber comprising:
        at least 35 milliequivalent per kilogram (Kg) amino end groups;
        at least one of: a) Silver metal particles and b) Silver cation particles; and
        the amino end groups and the at least one of: a) the Silver metal and b) the Silver cation particles, dispersed within the polymer of the fiber at a weight content within the range of approximately 10-100 parts per million (ppm);
    each fiber of the polyamide polymer fibers is of Partially Oriented Yarn (POY) type of tenacity within the range of approximately 3.0-4.5 grams per dtex and elongation within the range of approximately 60%-90% to render the textile as an antibacterial textile in accordance with the American Association of Textile Chemists and Colorists (AATCC) 100-2012 standard;
    the fibers blended inside the textile fabric, the fibers at a weight content within the range 0.5%-40.0% of the fibers of the textile; and,
    the content of the Silver metal particles and/or silver cation particles in the textile fabric are within the range of approximately 0.2-45.0 ppm.

4. The antibacterial textile of claim 3, wherein the Silver metal particles and/or Silver cation particles are of diameters less than 0.5 microns median diameter.

5. An antibacterial textile comprising:
    polyamide polymer fibers, each fiber of a Partially Oriented Yarn (POY) type comprising:
        at least 35 milliequivalent per kilogram (Kg) amino end groups, and silver, dispersed within the polymer of the fiber at a weight content within the range of approximately 10-100 parts per million (ppm); and,
        the polyamide polymer fibers are blended inside a textile fabric, the polyamide polymer fibers at a weight content within the range of approximately 0.5%-40.0% of the fibers of the textile fabric, such that the content of the silver in the textile fabric is within the range of approximately 0.2-45.0 ppm, whereby the textile fabric is antibacterial in accordance with the American Association of Textile Chemists and Colorists (AATCC) 100-2012 standard.

6. The antibacterial textile of claim 5, wherein said each fiber is of the Partially Oriented Yarn (POY) type comprises a tenacity within the range of approximately 3.0-4.5 grams per dtex and elongation within the range of approximately 60%-90%.

7. The antibacterial textile of claim 5, wherein the silver includes one or more of Silver metal particles and/or Silver cation particles.

8. The antibacterial textile of claim 7, wherein the Silver metal particles and/or Silver cation particles are of diameters less than 0.5 microns median diameter.

9. The antibacterial textile of claim 1, wherein the polyamide polymer fibers additionally comprise fibers of a length of approximately 0.1 millimeters (mm) to 200.0 mm.

10. The antibacterial textile of claim 1, wherein the POY is an un-drawn as spun POY fiber.

* * * * *